United States Patent
DeCusatis et al.

(10) Patent No.: US 8,417,239 B1
(45) Date of Patent: Apr. 9, 2013

(54) WIRELESS DEVICE COVERAGE MAPPING

(75) Inventors: Casimer M DeCusatis, Poughkeepsie, NY (US); Rajaram B Krishnamurthy, Wappingers Falls, NY (US); Brian Neugebauer, Hyde Park, NY (US); Michael Onghena, Poughquag, NY (US); Anuradha Rao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/313,396

(22) Filed: Dec. 7, 2011

(51) Int. Cl.
*H04W 24/00* (2006.01)

(52) U.S. Cl.
USPC ............. 455/423; 455/115.3; 455/456.2; 370/332

(58) Field of Classification Search ........... 455/115.1, 455/115.3, 456.1, 456.2, 456.3, 456.4, 456.5, 455/456.6, 404.2, 414.2, 513
See application file for complete search history.

(56) References Cited

U.S. PATENT DOCUMENTS

| | | | | |
|---|---|---|---|---|
| 7,751,780 B2* | 7/2010 | Saidi et al. | | 455/67.11 |
| 2011/0183688 A1* | 7/2011 | Dietrich et al. | | 455/456.1 |
| 2011/0191465 A1* | 8/2011 | Hofstaedter et al. | | 709/224 |
| 2012/0078501 A1* | 3/2012 | Haleem | | 701/408 |

OTHER PUBLICATIONS

Wright, "Time, Position, and Veolcity Just Ask Your GPS Chip Set", EDN Magazine, Mar. 1997, p. 31.
Schandle, Chandle, "The Femtocell Option", Electrical Engineering Times, Oct. 2006, p. 42.

* cited by examiner

*Primary Examiner* — Kamran Afshar
*Assistant Examiner* — Khalid Shaheed
(74) *Attorney, Agent, or Firm* — Steven Chiu; Dennis Jung

(57) ABSTRACT

Mapping signal strength. A signal strength monitor is polled to measure signal strength. Each polled signal strength is associated with an associated geographical position. The signal strength and the associated geographical position is stored in memory. The stored signal strength and the stored associated geographical position is sent to a server. A coverage map of a geographical area is generated based on the stored signal strength and the associated geographical position in memory.

17 Claims, 4 Drawing Sheets

WIRELESS DEVICE COVERAGE MAPPING

BACKGROUND

The present invention relates, in general, to coverage mapping of a region, and in particular, wireless device coverage mapping of a geographical region.

In the current environment, there are an increasingly large number of devices, such as mobile devices, in use. This includes wi-fi enabled laptops, smart phones, and conventional cell phones for voice communication or digital paging. Modern data centers, for example, show an increase in the use of these devices. It is important for key data center staff to have access to wireless tools in order to manage servers, contact key administrative staff, declare emergency conditions, etc. Traditionally, device coverage is accomplished through the placement of mobile hot spots in key locations. The devices rely on the effective broadcast radius of the hot spot to offer coverage.

Transmissions may be affected by multiple factors. Hot spot transmission may be blocked by unexpected features of different building, for example data center buildings or older structures that have been repurposed. Wireless transmission may also affected by local topography. For example, it is possible to have two cellular towers within three miles of each other, and have areas with no cellular coverage, such as a few city blocks wide, in the space between them. These effects can have a very disruptive effect on communications.

BRIEF SUMMARY

According to one embodiment of the present invention, a method, system, and program product is provided for mapping signal strength. A signal strength monitor is polled to measure signal strength. Each polled signal strength is associated with an associated geographical position. The signal strength and the associated geographical position is stored in memory. The stored signal strength and the stored associated geographical position is sent to a server. A coverage map of a geographical area based on the stored signal strength and the associated geographical position in memory is generated.

According to one embodiment of the present invention, associating each polled signal strength with an associated geographical position occurs in response to the signal strength having a value below a first threshold value. Responsive to the signal strength having a value below a first threshold value, a rate of the polling is increased. Storing the signal strength and the associated geographical position in memory occurs in response to the signal strength having a value below the first threshold value. Sending the stored signal strength and the stored associated geographical position to a server occurs in response to the signal strength having a value above a second threshold value.

According to one embodiment of the present invention, responsive to the signal strength decreasing towards a third threshold value, an amount of buffered data is increased in proportion to an anticipated signal strength.

According to one embodiment of the present invention, the third threshold is a previously determined threshold indicating an approaching geographical region known to have a low or no signal strength.

According to one embodiment of the present invention, a rate of the polling is manually configured by a user.

According to one embodiment of the present invention, a rate of the polling is linked to a global positioning satellite (GPS). The rate of polling is determined by a movement of a device.

According to one embodiment of the present invention, storing the signal strength and the associated geographical position in memory further comprises storing the signal strength and the associated geographical position in one or more files.

According to one embodiment of the present invention, generating the coverage map is further based on a received signal strength and a received associated geographical position from the server.

DETAILED DESCRIPTION

In accordance with one or more aspects of the present invention, a method, system, and computer program product is provided for wireless device coverage mapping. One or more aspects of the present invention may be implemented in a variety of ways, for example in devices including mobile phones, computers, laptops, etc. Existing cell phones and wi-fi devices may have build-in electronics which may measure wireless signal strength. Many of these devices, including smart phones, laptops, and other devices, may also contain global positioning system (GPS) and a signal strength monitor, for example described in Maury Wright, EDN magazine, March 1997, p. 31, "Time, Position, and Velocity: Just ask your GPS chip set", incorporated herein by reference.

In one embodiment, a software application implemented onto a device, such as a mobile device, may run in the background or foreground and may be linked to a signal strength monitor and a GPS. The signal strength monitor may be polled periodically to measure signal strength. An associated GPS may also be polled. The polling rate may be manually configured, or may be linked to the GPS, which may determine rate of polling of the device based on the rate of movement. Together the information may be stored in memory, such as flash memory, for example in a file. After a period of time, the information may be sent or uploaded to a server, such as a service provider. In one embodiment, the software application produces an aggregate signal strength map of the geographical area based on these files, which may be based on the information already present on the device or from information sent from the server. In one embodiment, a second application produces the aggregate signal strength map of the geographical area, which may based on information already present on the device or from information sent from the server.

Figure 1:
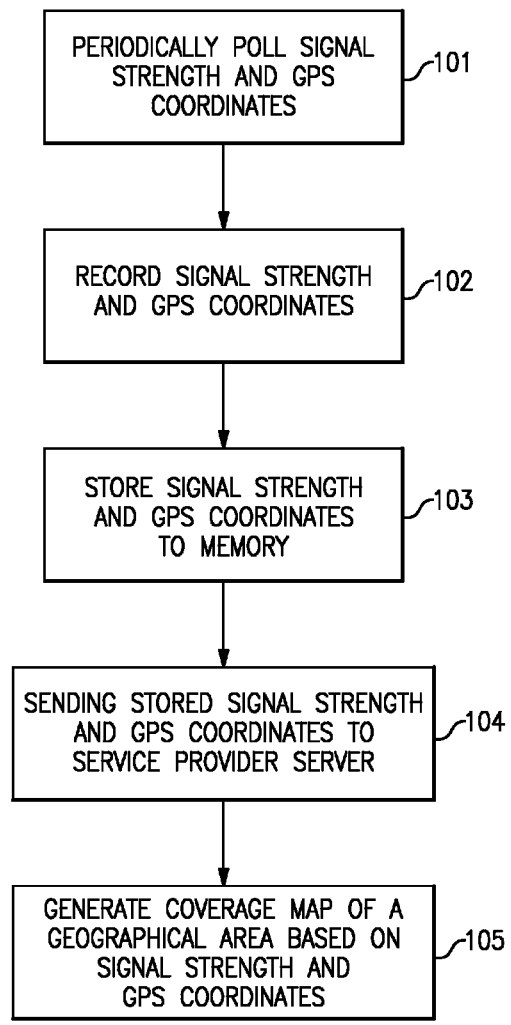
FIG. 1 illustrates one embodiment of a flow diagram in accordance with one or more aspects of an embodiment of the present invention.

One embodiment of a flow diagram for wireless device coverage mapping in accordance to one or more aspects of the present invention is described in reference to FIG. 1. The signal strength is periodically polled, for example from a signal strength monitor in the device, 101. An associated GPS coordinates is also obtained, for example from GPS in the device, 101. The rate of polling for the signal strength and the GPS coordinates may be predetermined, for example by a user or by the application itself. The signal strength and the GPS coordinates are recorded, 102, and subsequently stored into memory, such as flash memory, on the device or attached to the device, 103. The signal strength and GPS coordinates may be stored into a single file in memory, or in multiple files in memory.

After a predetermined period, the signal strength and GPS coordinates are sent to an outside server, for example a service provider server, 104. The predetermined period may be determined based on the number of signal strength and GPS coordinates, for example, a sending may occur for each individual single signal strength value and its associated GPS coordinates, or a sending may occur after multiple signal strength values and their associated GPS coordinates have been stored in memory. The predetermined period may also be determined based on a period of time, based on the value of the signal strength, or based on a signal strength threshold.

A coverage map of a geographical area is generated based on the signal strength and GPS coordinates, 105. In one embodiment, this coverage map may be generated based on the signal strength and GPS coordinates stored in memory on the device. In one embodiment, the coverage map may be generated based on an aggregated signal strength and GPS coordinates sent from the server, for example the service provider server may aggregate the signal strength and GPS coordinates from the device or a combination of devices including this device, and send it to the device. In one embodiment, the server may generate a coverage map based on the aggregated signal strength and GPS coordinates sent from the device or a combination of devices and send the coverage map to the device.

Figure 2:
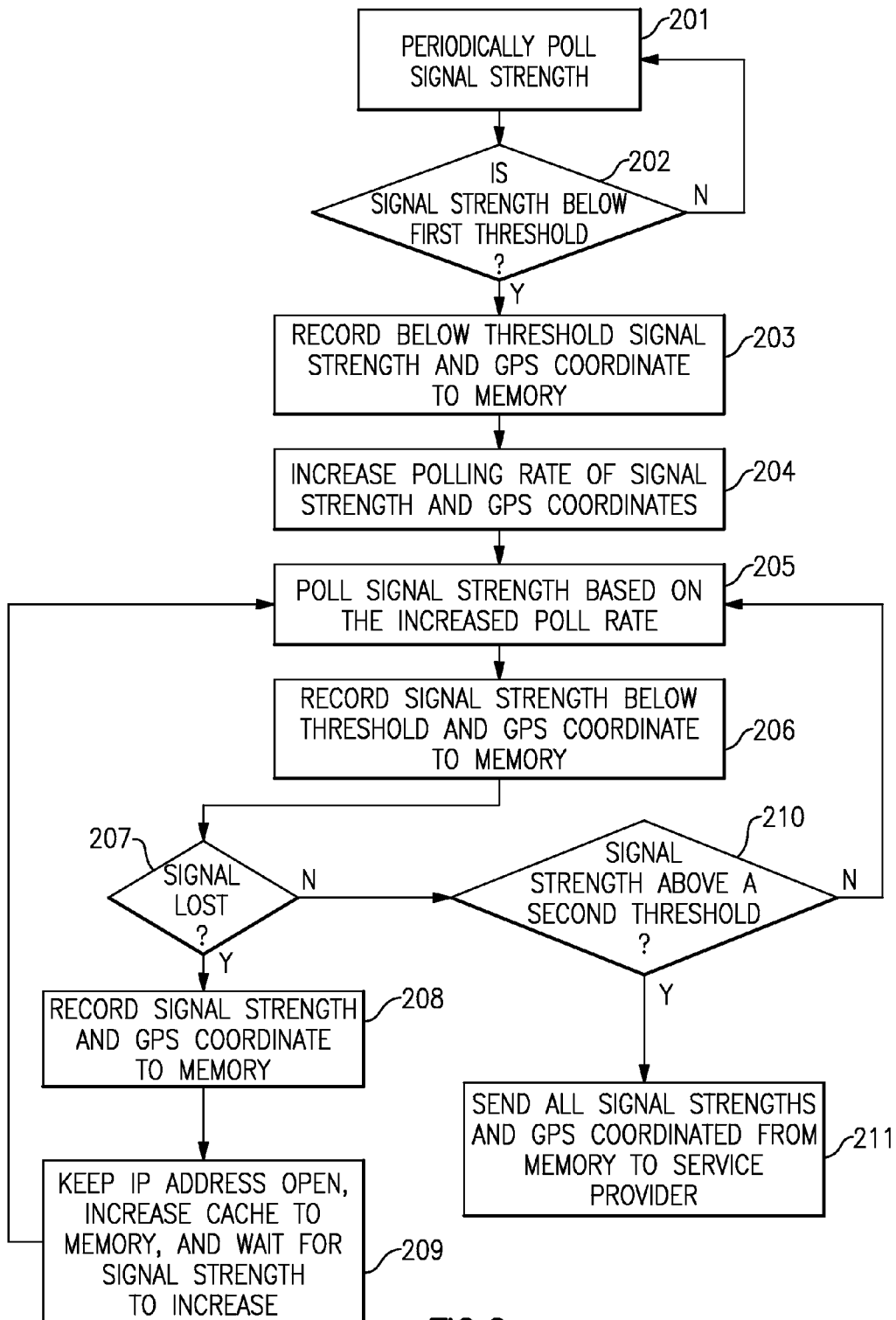
FIG. 2 illustrates one embodiment of a flow diagram in accordance with one or more aspects of an embodiment of the present invention.

One embodiment of a flow diagram for wireless device coverage mapping in accordance to one or more aspects of the present invention is described in reference to FIG. 2. The signal strength is periodically polled, for example from a signal strength monitor in the device. An associated GPS coordinates is also obtained, for example from the GPS in the device, 201. As described in FIG. 1, the polling rate of the signal strength and the GPS coordinates may be predetermined. After polling the signal strength, the signal strength is checked against a first threshold, 202. This may be a predetermined minimum threshold and may be predetermined by the user, the application itself, or the server. If the signal strength is above or equal to the first threshold, step 201 occurs and the process continues. In one embodiment, step 202 may check to see if the signal strength is above and not equal to the first threshold, and if it is, the process will move on to step 201.

If the signal strength is below the first threshold, then that signal strength and GPS coordinate is recorded and stored in memory, such as flash memory, on the device or attached to the device, 203. In one embodiment, step 202 may check to see if the signal strength is below and equal to the first threshold, and if it is, the process will move on to step 203. As described in FIG. 1, the signal strength and GPS coordinates may be stored in a single file or multiple files in memory. The polling rate for the signal strength and the GPS coordinates is then increased, 204. This allows the device to generate a finer granularity resolution of the signal strength. The polling rate may be predetermined, for example by the user, the application or the server, or dynamically changed based on the signal strength The signal strength continues to be poll based on the increased polling rate, 205. Each polled signal strength below the threshold and its associated GPS coordinate is stored in memory.

A check is performed in 207 to determine if the signal is lost, for example if the signal strength is equal to zero. If the signal is lost, then the lost signal value, such as zero, and its associated GPS coordinate is recorded and stored into memory, 208. In one embodiment, step 209 may occur. To help mitigate the lost signal, an IP address that the device was connected to may be kept open, 209. The cache to memory for data transferred to and from the IP address may be increased so that data may continue to be processed or inputted at the device during the signal outage, 209. The device may wait for the signal strength to increase, 209. Step 209 is not limited to the descriptions written above, and may encompass other methods of mitigating service interruption as known in the art, such as Jack Schandle, Electrical Engineering Times, October 2006, p. 42, "The Femtocell Option", incorporated herein by reference.

If the signal is checked, 207, and determined not to be lost, for example the value is not equal to zero, then the signal strength is checked to see if it is above a second threshold, 210. The second threshold may be a predetermined second threshold and may be predetermined by the user, the application itself, or the server. For example, the second threshold may correspond to 2 to 3 bars on a cell phone with a 5 bar maximum. If the signal strength is above the second threshold, then all the signal strengths and GPS coordinates stored in memory may be sent to the server, for example the service provider. In one embodiment, step 210 may check to see if the signal strength is above or equal to the second threshold, and if it is, the process will move on to step 201. If the signal strength is below and equal to the second threshold, then step 205 occurs and the process continues. In one embodiment, step 210 may check to see if the signal strength is below and not equal to the second threshold, and if it is, will move on to step 205.

In one embodiment, the signal strength needs to stay below first threshold for a predetermined duration of time before an increased polling rate is initiated, 204. This predetermined duration of time may be preprogrammed into the device, for example by the user, the application itself, or the server. If the signal strength goes below the first threshold and then back above threshold before this predetermined time, normal polling rate is maintained, 201. If the signal strength goes below the first threshold and then maintains this for the predetermined period of time, the increased polling rate will be invoked, 204. In one embodiment, the signal strength has to be below or equal to the first threshold for a predetermined period of time in order for the increased polling rate to occur, 204.

In one embodiment, one or more aspects of the present invention may be able to map local dead zones, such as a particular geographical area with a known low or zero signal strength. Many such mappings may be generated by large numbers of devices, and when aggregated, may be used to effectively map dead zones over an extended geographic area. Furthermore, the dead zones may change over time as new buildings are constructed, new signal towers are put in place, etc. The software application may remap these areas and dynamically provide updates to a server, such as a service provider. In one embodiment, the server may send the aggregated files or may generate the coverage map itself, and send it to the device.

In a one embodiment, one or more aspects of the present invention may also allow the device to detect when a dead zone is being approached. In one embodiment, the device is aware of the dead zone in advance, for example through the generated coverage map. When the signal has decreased towards a predetermined threshold that indicates that a known dead zone in the geographical area is approaching, an increased amount of buffered data, for example from an IP address or multiple IP addresses connected or used by the device, is received in proportion to the anticipated dead zone coverage. The IP address or addresses connected or used by the device may be maintained as open when presented with an outage or lost signal, such as when the signal strength is zero. This enables the device to continue operating through the dead zone or minimize service disruption when certain applications are running.

The embodiments in accordance to one or more aspects of the present invention described in reference to FIG. 1, FIG. 2, and the descriptions above may contain elements that may be combined or used interchangeably.

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, the embodiments of present invention may be embodied as a system, method or computer program product. Accordingly, the embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment of present invention may take the form of a computer program product embodied in any tangible medium of expression having computer usable program code embodied in the medium.

Figure 3:
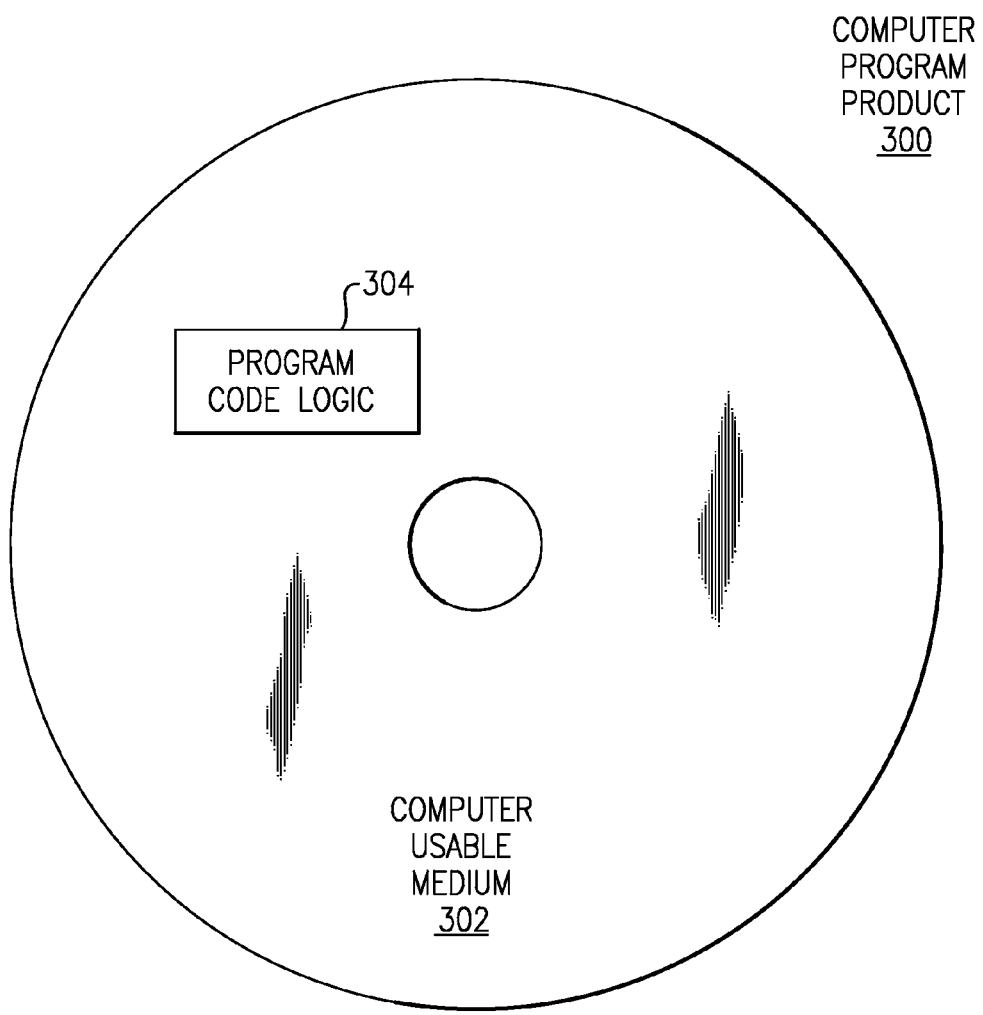
FIG. 3 illustrates one embodiment of a computer program product to incorporate one or more aspects of an embodiment of the present invention.

One example of a computer program product incorporating one or more aspects of an embodiment of the present invention is described with reference to FIG. 3. A computer program product 300 includes, for instance, one or more computer usable media 302 to store computer readable program code means or logic 304 thereon to provide and facilitate one or more aspects of an embodiment of the present invention. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
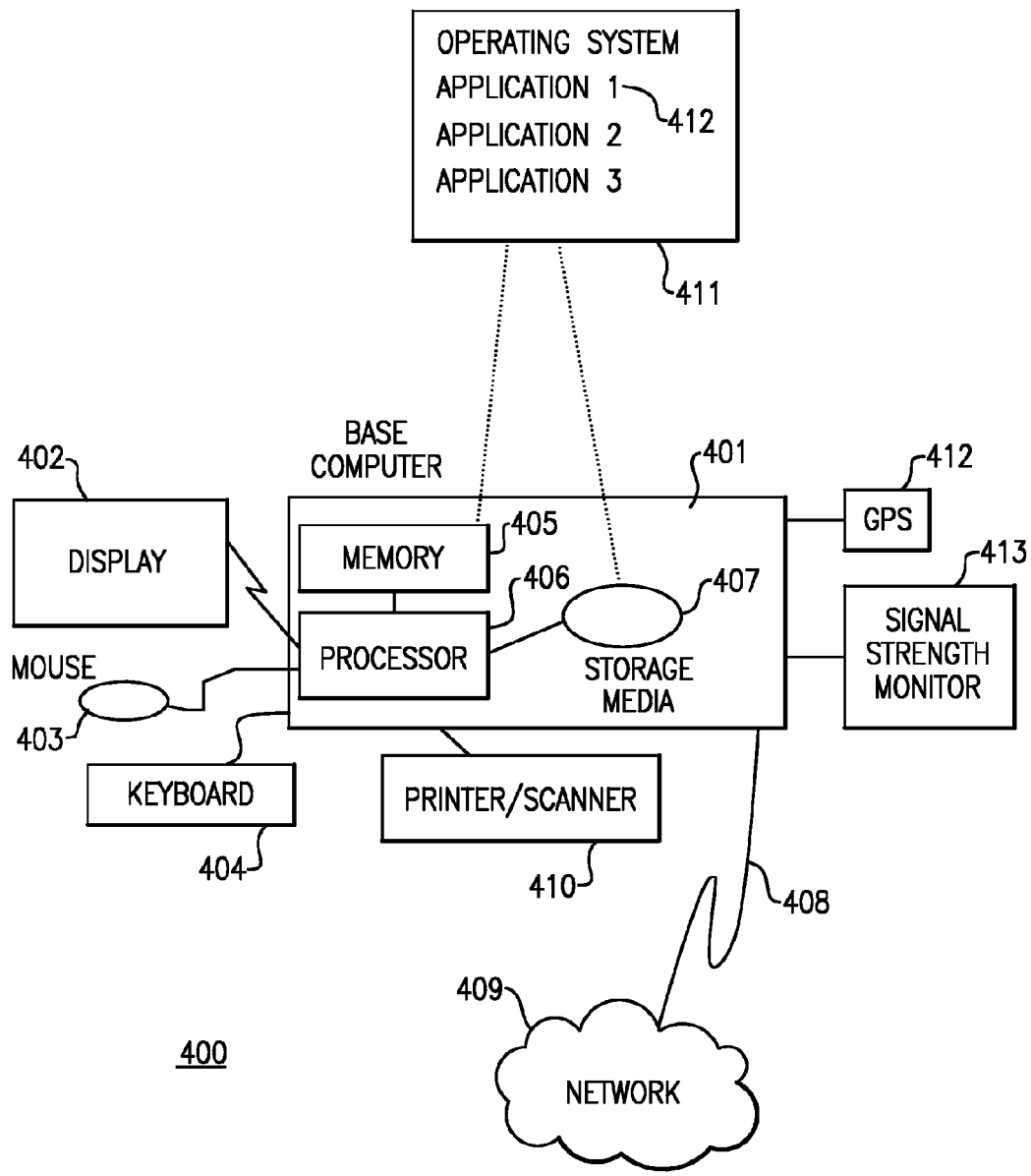
FIG. 4 illustrates one embodiment of a computer system in which an embodiment of the present invention may be practiced.

FIG. 4 illustrates an embodiment of computer system in which an embodiment of the present invention may be practiced. The system comprises a computer system 401, such as a device, a personal computer, a workstation, a server, a storage device, or host, including optional peripheral devices. The optional peripheral devices may be internal or external to the computer system 401. The computer system 401 includes one or more processors 406 and a bus employed to connect and enable communication between the processor(s) 406 and the other components of the computer system 401 in accordance with known techniques. The bus connects the processor 406 to memory 405 and long-term storage 407 which can include a hard drive (including any of magnetic media, CD, DVD and Flash Memory for example) or a tape drive for example. The computer system 401 might also include a user interface adapter, which connects the microprocessor 406 via the bus to one or more interface devices, such as a keyboard 504, mouse 403, a printer/scanner 410 and/or other interface devices, which can be any user interface device, such as a touch sensitive screen, digitized entry pad, etc. The bus also connects a display device 402, such as an LCD screen or monitor, to the microprocessor 406 via a display adapter. The computer system 401 might also include a GPS 412 or a signal strength monitor 413.

The computer system 401 may communicate with other computers or networks of computers by way of a network adapter capable of communicating 408 with a network 409. For example, network adapters may include communications channels, token ring, Ethernet or modems. Alternatively, the computer system 401 may communicate using a wireless interface, such as a CDPD (cellular digital packet data) card. The computer system 401 may be associated with such other computers in a Local Area Network (LAN), VLAN, or a Wide Area Network (WAN), or the computer system 401 may be a client in a client/server arrangement with another computer, etc. All of these configurations, as well as the appropriate communications hardware and software, are known in the art.

Software programming code which embodies the present invention may be typically accessed by the processor 406 from long-term storage media 407. The software programming code may be embodied on any of a variety of known media for use with a data processing system, as previously described above with reference to FIG. 3. The code may be distributed on such media, or may be distributed to users from the memory or storage of one computer system over a network to other computer systems.

Alternatively, the programming code 411 may be embodied in the memory 405, and accessed by the processor 406 using the processor bus. Such programming code may include an operating system which controls the function and interaction of the various computer components and one or more application programs 412. Program code may be normally paged from storage media 407 to memory 405 where it may be available for processing by the processor 406. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow.

What is claimed is:

1. A method for mapping signal strength comprising: polling a signal strength monitor to measure signal strength;
   associating each polled signal strength with an associated geographical position;
   storing said signal strength and said associated geographical position in memory;
   sending said stored signal strength and said stored associated geographical position to a server;
   generating a coverage map of a geographical area based on said stored signal strength and said associated geographical position in memory;
   wherein associating each polled signal strength with an associated geographical position occurs based on said signal strength having a value below a first threshold value;
   based on said signal strength having a value below a first threshold value, increasing a rate of said polling; and
   wherein storing said signal strength and said associated geographical position in memory occurs based on said signal strength having a value below said first threshold value
   wherein based on signal strength decreasing towards a third threshold value, increasing an amount of buffered data in proportion to an anticipated signal strength.

2. The method according to claim 1 further comprising:
   sending said stored signal strength and said stored associated geographical position to a server based on said signal strength having a value above a second threshold value.

3. The method according to claim 2, wherein said third threshold is a previously determined threshold indicating an approaching geographical region known to have a low or no signal strength.

4. The method according to claim 1, wherein a rate of said polling is manually configured by a user.

5. The method according to claim 1, wherein a rate of said polling is linked to a global positioning satellite (GPS), said rate of polling determined by a movement of a device.

6. The method according to claim 1, wherein storing said signal strength and said associated geographical position in memory further comprises storing said signal strength and said associated geographical position in one or more files.

7. The method according to claim 1, wherein generating said coverage map is further based on a received signal strength and a received associated geographical position from said server.

8. A system for mapping signal strength comprising: a memory; a processor in communications with said memory, said processor capable of performing a method comprising:
   polling a signal strength monitor to measure signal strength;
   associating each polled signal strength with an associated geographical position;
   storing said signal strength and said associated geographical position in memory;
   sending said stored signal strength and said stored associated geographical position to a server;
   generating a coverage map of a geographical area based on said stored signal strength and said associated geographical position in memory;
   wherein associating each polled signal strength with an associated geographical position occurs based on said signal strength having a value below a first threshold value;
   based on said signal strength having a value below a first threshold value, increasing a rate of said polling; and
   wherein storing said signal strength and said associated geographical position in memory occurs based on said signal strength having a value below said first threshold value
   wherein based on said signal strength decreasing towards a third threshold value, increasing an amount of buffered data in proportion to an anticipated signal strength.

9. The system according to claim 8 further comprising:
   sending said stored signal strength and said stored associated geographical position to a server based on said signal strength having a value above a second threshold value.

10. The system according to claim 9, wherein said third threshold is a previously determined threshold indicating an approaching geographical region known to have a low or no signal strength.

11. The system according to claim 8, wherein a rate of said polling is manually configured by a user.

12. The system according to claim 8, wherein a rate of said polling is linked to a global positioning satellite (GPS), said rate of polling determined by a movement of a device.

13. The system according to claim 8, wherein storing said signal strength and said associated geographical position in memory further comprises storing said signal strength and said associated geographical position in one or more files.

14. The system according to claim 8, wherein generating said coverage map is further based on a received signal strength and a received associated geographical position from said server.

15. A computer program product for mapping signal strength, the computer program product comprising:
 a non-transitory storage medium readable by a processing circuit and storing instructions for execution by the processing circuit for performing a method comprising:
 polling a signal strength monitor to measure signal strength;
 associating each polled signal strength with an associated geographical position;
 storing said signal strength and said associated geographical position in memory;
 sending said stored signal strength and said stored associated geographical position to a server;
 generating a coverage map of a geographical area based on said stored signal strength and said associated geographical position in memory;
 wherein associating each polled signal strength with an associated geographical position occurs in response to said signal strength having a value below a first threshold value;
 based on said signal strength having a value below a first threshold value, increasing a rate of said polling; and
 wherein storing said signal strength and said associated geographical position in memory occurs based on said signal strength having a value below said first threshold value
 wherein based on said signal strength decreasing towards a third threshold value, increasing an amount of buffered data in proportion to an anticipated signal strength.

16. The computer program product according to claim 15 further comprising:
 sending said stored signal strength and said stored associated geographical position to a server based on said signal strength having a value above a second threshold value.

17. The computer program product according to claim 16, wherein said third threshold is a previously determined threshold indicating an approaching geographical region known to have a low or no signal strength.

* * * * *